(12) United States Patent
Cho et al.

(10) Patent No.: US 9,538,500 B2
(45) Date of Patent: Jan. 3, 2017

(54) METHOD FOR DETERMINING MOVING DIRECTION OF TERMINAL AND CORRECTING POSITION THEREOF, AND POSITIONING APPARATUS USING THE METHOD

(71) Applicant: ELECTRONICS AND TELECOMMUNICATIONS RESEARCH INSTITUTE, Daejeon (KR)

(72) Inventors: Youngsu Cho, Daejeon (KR); Myungin Ji, Daejeon (KR); Jooyoung Kim, Daejeon (KR); Yang Koo Lee, Daejeon (KR); Sang Joon Park, Daejeon (KR); Jong-Hyun Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/645,414

(22) Filed: Mar. 11, 2015

(65) Prior Publication Data
US 2015/0282116 A1    Oct. 1, 2015

(30) Foreign Application Priority Data
Mar. 28, 2014   (KR) .................. 10-2014-0037251

(51) Int. Cl.
*H04W 64/00*   (2009.01)
(52) U.S. Cl.
CPC ................. *H04W 64/006* (2013.01)

(58) Field of Classification Search
CPC ...... H04W 4/026; H04W 4/02; H04W 64/006; H04W 36/245; H04W 36/32; H04W 4/028
(Continued)

(56) References Cited

U.S. PATENT DOCUMENTS 8,526,967 B2    9/2013   Alizadeh-Shabdiz et al.
2008/0224917 A1   9/2008   Kim et al.
(Continued)

FOREIGN PATENT DOCUMENTS

KR    10-0882351 B1    2/2009
KR    10-1214143 B     12/2012

OTHER PUBLICATIONS

Christof Röhrig et al., "Mobile Robot Localization Using WLAN Signal Strengths", IEEE International Workshop on Intelligent Data Acquisition and Advanced Computing Systems: Technology and Applications, Sep. 21-23, 2009, vol. 7, No. 2, pp. 73-83.
(Continued)

*Primary Examiner* — Inder Mehra
(74) *Attorney, Agent, or Firm* — Rabin & Berdo, P.C.

(57) ABSTRACT

Provided are a method for determining a moving direction of a terminal and correcting a position thereof, and a positioning apparatus using the same. Relative direction information is estimated based on N pieces of position information of the terminal, and distortion information is removed from the relative direction information to acquire relative direction information without direction integrity. Further, the relative direction information is transmitted into absolute direction information to acquire a moving path direction of the terminal. Next, the position information of the terminal is corrected based on the moving path direction of the terminal.

15 Claims, 16 Drawing Sheets

(58) Field of Classification Search
USPC .............. 701/400, 410, 454; 455/456.1, 436, 455/456.3, 404.2, 414.1, 414.2, 440
See application file for complete search history.

(56) References Cited

U.S. PATENT DOCUMENTS

| | | | |
|---|---|---|---|
| 2010/0125414 A1* | 5/2010 | Okuyama | G01C 22/00 701/494 |
| 2010/0161224 A1 | 6/2010 | Lee et al. | |
| 2011/0064000 A1 | 3/2011 | Kim et al. | |
| 2012/0176376 A1* | 7/2012 | Kim | H04W 4/026 345/419 |
| 2012/0296603 A1* | 11/2012 | Kulik | G01C 22/006 702/160 |
| 2014/0031044 A1* | 1/2014 | Mazzarella | H04W 36/245 455/440 |

OTHER PUBLICATIONS

Mohamed Mahar Atia et al., "Dynamic Propagation Modeling for Mobile Users' Position and Heading Estimation in Wireless Local Area Networks", IEEE Wireless Communications Letters, vol. 1, No. 2, Apr. 2012, pp. 101-104.

* cited by examiner

FIG. 5
Input: $\{X_{dev}, Y_{dev}\}_{T-(N-1)}, \{X_{dev}, Y_{dev}\}_{T-1}, ..., \{X_{dev}, Y_{dev}\}_T$
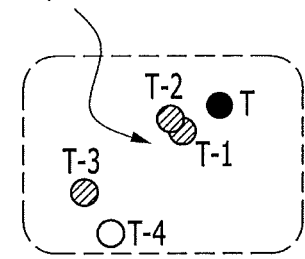
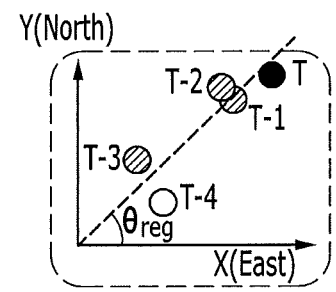

1) Positions of terminal at time T-1, T-2, T-3, and T-4 are same.
2) According to position of terminal at time T, moving path direction of terminal is determined to be contrary to each other

FIG. 8

(θ integrity solving example(1): when pedestrian moves forward in one direction)

(integrity tolerance limit = in the case of three times)

| epoch | 1 | 2 | 3 | 4 | 5 | 6 | 7 | 8 | 9 |
|---|---|---|---|---|---|---|---|---|---|
| Heading($\theta_{amb}$) (Before integrity is solved) | ↗ | ↗ | ↙ | ↗ | ↗ | ↙ | ↙ | ↙ | ↗ |
| Heading($\theta_{int}$) (After integrity is solved) | ↗ | ↗ | ↗ | ↗ | ↗ | ↗ | ↗ | ↗ | ↗ |

(A)

(θ integrity solving example(2): when pedestrian moves forward in one direction and then moves backward)

(integrity tolerance limit = in the case of three times)

| epoch | 1 | 2 | 3 | 4 | 5 | 6 | 7 | 8 | 9 |
|---|---|---|---|---|---|---|---|---|---|
| Heading($\theta_{amb}$) (Before integrity is solved) | ↗ | ↗ | ↗ | ↙ | ↙ | ↙ | ↙ | ↗ | ↙ |
| Heading($\theta_{int}$) (After integrity is solved) | ↗ | ↗ | ↗ | ↗ | ↗ | ↗ | ↙ | ↙ | ↙ |

Actual direction change time (forward→backward)

Direction change time after integrity is verified (forward→backward)

Latency occurs at the time of direction change but removal of distorted heading value is efficient (B)

METHOD FOR DETERMINING MOVING DIRECTION OF TERMINAL AND CORRECTING POSITION THEREOF, AND POSITIONING APPARATUS USING THE METHOD

CROSS-REFERENCE TO RELATED APPLICATION

This application claims priority to and the benefit of Korean Patent Application No. 10-2014-0037251 filed in the Korean Intellectual Property Office on Mar. 28, 2014, the entire contents of which are incorporated herein by reference.

BACKGROUND OF THE INVENTION (a) Field of the Invention

The present invention relates to a method for determining a moving direction of a terminal and correcting a position thereof using a wireless local area network (WLAN), and a positioning apparatus using the same.

(b) Description of the Related Art

A positioning technology using wireless communication infrastructure is diverse according to a kind of infrastructure and a service range. A global navigation satellite system (GNSS) is a system which determines a position of a user using a signal of a satellite in an earth orbit, and a global positioning system (GPS) of America, a global navigation satellite system (GLONASS) of Russia, Galileo of Europe, and the like are being currently operated or are due to be operated. The GNSS is disposed to serve all over the globe, and is configured to include a satellite unit transmitting a signal including precise time information and satellite orbit information, a receiving unit receiving at least four satellite signals to calculate a position and a speed, and a terrestrial control unit monitoring and controlling a state and an orbit of the satellite.

The GNSS provides high position accuracy and availability within about 10 m in a plain or suburban districts in which a direct line of sight of the satellite unit and the receiving unit are secured; however, the GNSS has a problem in that a position error reaches 50 m due to a multipath error in a high density city area which is a non line of sight section, and particularly, received signal sensitivity deteriorates in the interior of a room to make it difficult to acquire a signal, such that a position and a speed may not be determined.

A cellular-based positioning technology is a technology of determining a position of a user using position information and a measurement signal of a mobile communication base station, and more specifically, is classified into cell-ID, enhanced-observed time difference (E-OTD), advanced-forward link trilateration (AFLT), and the like according to the number of base stations which may communicate with a terminal. Considering characteristics of mobile communication infrastructure having most of the downtown areas and the suburban districts as a service range, the cellular-based positioning technology may determine a position outdoors and indoors. However, the cellular-based positioning technology has different positioning accuracy depending on a disposition density of the base stations, and has relatively lower position accuracy of about 100 to 800 m on average and thus is hardly applied to interior and exterior navigation services and the like which require position accuracy of several meters.

An assisted GNSS (AGNSS) is a technology of acquiring ancillary information from a positioning server to improve the minimum received signal sensitivity of the GNSS receiver embedded in the terminal and shorten time to first fix. The AGNSS may quickly determine a position using the GNSS in the high density city area which is in weak signal environment, but may not obtain a large effect since the received signal is very weak in the interior area.

As a representative Wi-Fi-based positioning method for overcoming a difficulty in interior positioning as described above, there are a method for calculating a position of a terminal using a position and a measurement signal of a Wi-Fi access point (Wi-Fi AP), a fingerprinting method using a radio map of a Wi-Fi AP, and the like.

The Wi-Fi AP position-based positioning method estimates a collection position of a vehicle or a pedestrian and a position of the Wi-Fi AP using received signal intensities for each Wi-Fi AP, and calculates a position of a terminal based on positioning algorithms such as trilateration, weight centroid localization (WCL), Monte-Carlo, and the like, using the estimated position of the Wi-Fi AP. The fingerprinting-based positioning method processes the collection position of a vehicle and a pedestrian and the received signal intensities for each Wi-Fi AP to generate a wireless map of a reference position. Finally, the reference position having a minimum received signal intensity error is estimated as the position of the terminal by comparing Wi-Fi received signal intensity patterns for each AP which are measured by the wireless map and the terminal.

In connection with various positioning methods as described above, the Wi-Fi-based positioning technology may more precisely provide the position information of the terminal in the interior environment, as compared with the typical GNSS technology and the cellular-based positioning technology. However, the typical Wi-Fi-based positioning technology has a difficulty in calculating direction information (heading), which is other useful information, in addition to the position information.

In the typical Wi-Fi, the methods for calculating direction information are as follows.

First, when the position of the Wi-Fi AP is already known and the position of the terminal is calculated or when a fingerprinting DB including the direction and position of the terminal is already constructed even though the position of the Wi-Fi AP is unknown, the direction information between the AP and the terminal may be calculated using a beam antenna. However, since the method requires an expensive beam antenna and has considerable constraint conditions at the time of designing a terminal antenna, the method is inappropriate to apply to a commercial terminal.

Second, when the position of the Wi-Fi AP is known and the position of the terminal is calculated, the method may determine whether the terminal approaches or retreats from the AP using a change rate of the received signal intensity between the AP and the terminal. However, since noise of the received signal intensity is large in the general terminal environment, the direction of the terminal for the APs having a maximum cluster size is determined based on K-nearest neighbor clustering to remove an abnormal measurement value. The method may be applied to a commercial smart phone without an expensive beam antenna, but has reduced estimated direction accuracy due to instability of the Wi-Fi received signal intensity and therefore may not be applied to the fingerprinting method which does not know the position of the AP.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method for determining a moving direction of a terminal and correcting a position thereof, and a positioning apparatus using the same, having advantages of determining a moving path direction of the terminal using a wireless local area network (WLAN) and correcting a position of the terminal based on the moving path direction.

An exemplary embodiment of the present invention provides a method for determining a moving path direction of a terminal and correcting a position thereof, including: acquiring the position information of the terminal and estimating relative direction information based on N pieces of position information; determining whether the estimated relative direction information is a forward direction or a backward direction to acquire first relative direction information without direction ambiguity; removing distortion information from the first relative direction information to acquire second relative direction information without direction integrity; transforming the second relative direction information into absolute direction information to acquire a moving path direction of the terminal; and correcting the position information of the terminal based on the moving path direction of the terminal.

The estimating of the relative direction information may include: calculating a linear function for the N pieces of position information including current position information of the terminal and past position information of the terminal; and estimating the relative direction information based on a slope value of the linear function.

The N may represent a total number of pieces of position information used at the time of estimating the relative direction information, and may be set based on a maximum value reflecting motion characteristics deviating from a position error range of the terminal and a minimum value having a moving path direction estimation error of the terminal due to a tolerable latency.

The acquiring of the first relative direction information may include: calculating a position variation vector direction for the N pieces of position information; acquiring a comparison value based on the estimated relative direction information and the position variation vector direction; and when the comparison value is present within a predetermined angle by comparing the comparison value with the predetermined angle, using the estimated relative direction information as the first relative direction information. The comparison value may be an absolute value which is a difference value between the relative direction information and the position variation vector direction.

The acquiring of the second relative direction information may include: when the first relative direction information represents the same direction and then represents another direction by the number of times that the first relative direction information is within a predetermined maximum integrity tolerance limit, determining and removing the first relative direction information representing the other direction as distorted information; and when the first relative direction information represents the same direction and then represents another direction by the number of times that the first relative direction information deviates from a predetermined maximum integrity tolerance limit, determining the first relative direction information representing the other direction as information without distortion and using the first relative direction information as the direction information.

The method may further include, after the acquiring of the moving path direction of the terminal, when the absolute direction information acquired by transforming the second relative direction information is primitive absolute direction information, filtering the primitive absolute direction information to acquire filtered absolute direction information.

In the acquiring of the filtered absolute direction information, Kalman filtering or Kalman smoothing may be performed on the primitive absolute direction information to acquire the filtered absolute direction information.

The correcting of the position information of the terminal may include: when the currently acquired position information of the terminal is defined as the primitive position information, in the case in which the primitive position information is present in the moving path direction of the terminal, the moving path direction of the terminal matches the primitive position information to acquire corrected position information; and in the case in which the primitive position information is not present in the moving path direction of the terminal, removing the primitive position information and using the previously acquired position information of the terminal as the current position information of the terminal.

The method may further include: acquiring a position variation vector to a previous filtering position, a position variation vector to a previous measurement position, and a direction vector by using the previously acquired absolute direction information and continued past position information; when an inner product value of the position variation vector to the previous measurement position and the direction vector is a positive number or has a value of "0" or an inner product value of the position variation vector to the previous filtering position and the direction vector is a positive number or has a value of "0", determining that the primitive position information is present in the moving path direction of the terminal; and when the inner product value of the position variation vector to the previous filtering position and the direction vector has a negative value, determining that the primitive position information is not present in the moving path direction of the terminal.

Another embodiment of the present invention provides a positioning apparatus of a terminal, including: a terminal position information acquisition unit acquiring position information of the terminal; a direction estimation unit estimating relative direction information based on N pieces of position information provided from the terminal position information acquisition unit and acquiring moving path direction of the terminal based on the estimated relative direction information; and a position information correction unit correcting the position information of the terminal based on the moving path direction of the terminal, wherein the direction estimation unit may include: a direction ambiguity solving unit determining whether the estimated relative direction information is a forward direction or a backward direction to acquire first relative direction information without direction ambiguity; a direction integrity solving unit removing distortion information from the first relative direction information to acquire second relative direction information without direction integrity; and an absolute direction estimation unit transforming the second relative direction information into absolute direction information to acquire a moving path direction of the terminal.

The direction estimation unit further may include a relative direction estimation unit calculating a linear function for the N pieces of position information including current position information of the terminal and past position information of the terminal and estimating the relative direction information based on a slope value of the linear function.

The direction ambiguity solving unit may use the estimated relative direction information as the first relative direction information when a comparison value based on a position variation vector direction for the N pieces of position information and the estimated relative direction information is present within a predetermined angle, the comparison value being an absolute value of a difference value between the estimated relative direction information and the position variation vector direction.

The direction integrity solving unit may determine and remove the first relative direction information representing the other direction as distorted information when the first relative direction information represents the same direction and then represents another direction by the number of times that the first relative direction information is within a predetermined maximum integrity tolerance limit. The direction integrity solving unit may determine the first relative direction information representing the other direction as information without distortion and use the first relative direction information as the direction information when the first relative direction information represents the same direction and then represents another direction by the number of times that the first relative direction information deviates from a predetermined maximum integrity tolerance limit.

The positioning apparatus may further include, when the absolute direction information acquired by transforming the second relative direction information is primitive absolute direction information, a direction filtering unit filtering the primitive absolute direction information to acquire filtered absolute direction information.

The position information correction unit may match the moving path direction of the terminal with the primitive position information to acquire corrected position information when the currently acquired position information of the terminal is defined as the primitive position information, in the case in which the primitive position information is present in the moving path direction of the terminal, and may remove the primitive position information and use the previously acquired position information of the terminal as the current position information of the terminal in the case in which the primitive position information is not present in the moving path direction of the terminal.

The position information correction unit may acquire a position variation vector to a previous filtering position, a position variation vector to a previous measurement position, and a direction vector by using the previously acquired absolute direction information and continued past position information, and may determine that the primitive position information is present in the moving path direction of the terminal when an inner product value of the position variation vector to the previous measurement position and the direction vector is a positive number or has a value of "0", or an inner product value of the position variation vector to the previous filtering position and the direction vector is a positive number or has a value of "0". The position information correction unit may determine that the primitive position information is not present in the moving path direction of the terminal when the inner product value of the position variation vector to the previous filtering position and the direction vector has a negative value.

BRIEF DESCRIPTION OF THE DRAWINGS

FIG. 5 is an exemplified diagram of position information and a linear function therefor according to the exemplary embodiment of the present invention.

FIG. 8 is an exemplified diagram illustrating a process of acquiring relative direction information without direction integrity for two different pedestrian motion scenarios according to an exemplary embodiment of the present invention.

DETAILED DESCRIPTION OF THE EMBODIMENTS

Figure 1:
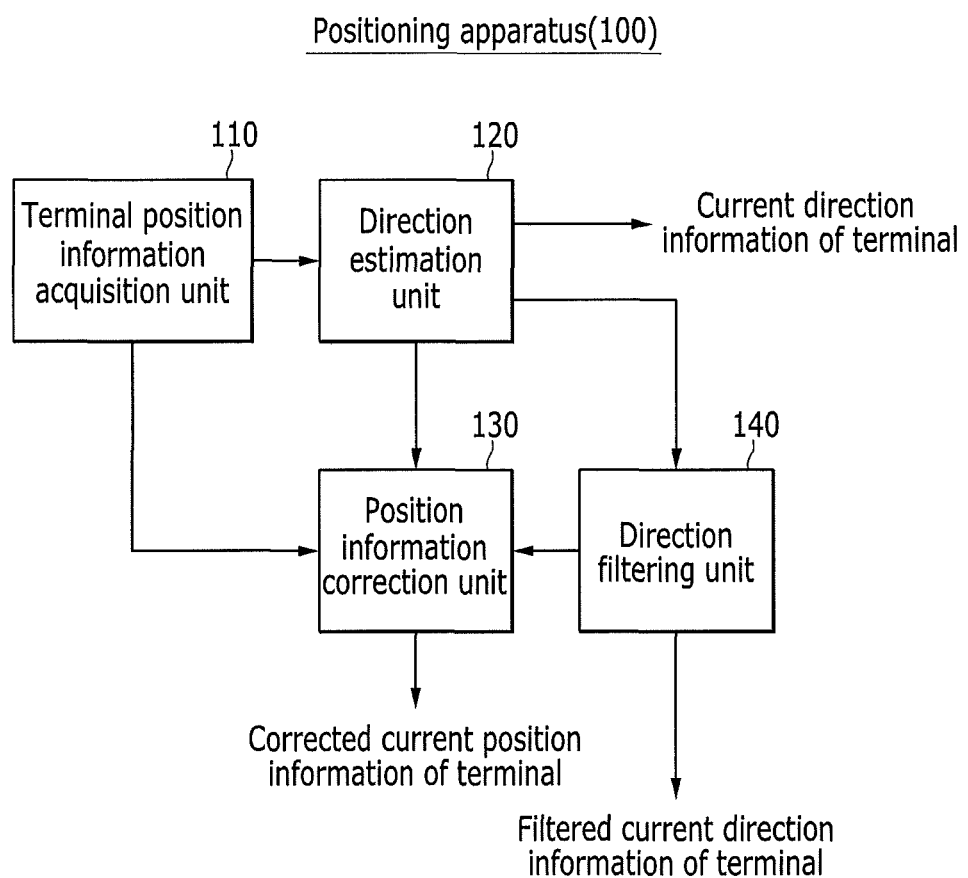
FIG. 1 is a configuration diagram of a positioning apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a positioning method and a positioning apparatus according to an exemplary embodiment of the present invention will be described with reference to the accompanying drawings.

According to an exemplary embodiment of the present invention, a moving path direction (heading) of a terminal is determined using current and past position information of the terminal which is calculated using a wireless local area network (WLAN), and the position of the terminal is corrected using the determined moving path direction of the terminal.

FIG. 1 is a configuration diagram of a positioning apparatus according to an exemplary embodiment of the present invention.

As illustrated in FIG. 1, a positioning apparatus 100 according to an exemplary embodiment of the present invention includes a terminal position information acquisition unit 110, a direction estimation unit 120, and a position information correction unit 130, and may optionally include a direction filtering unit 140.

Figure 2:
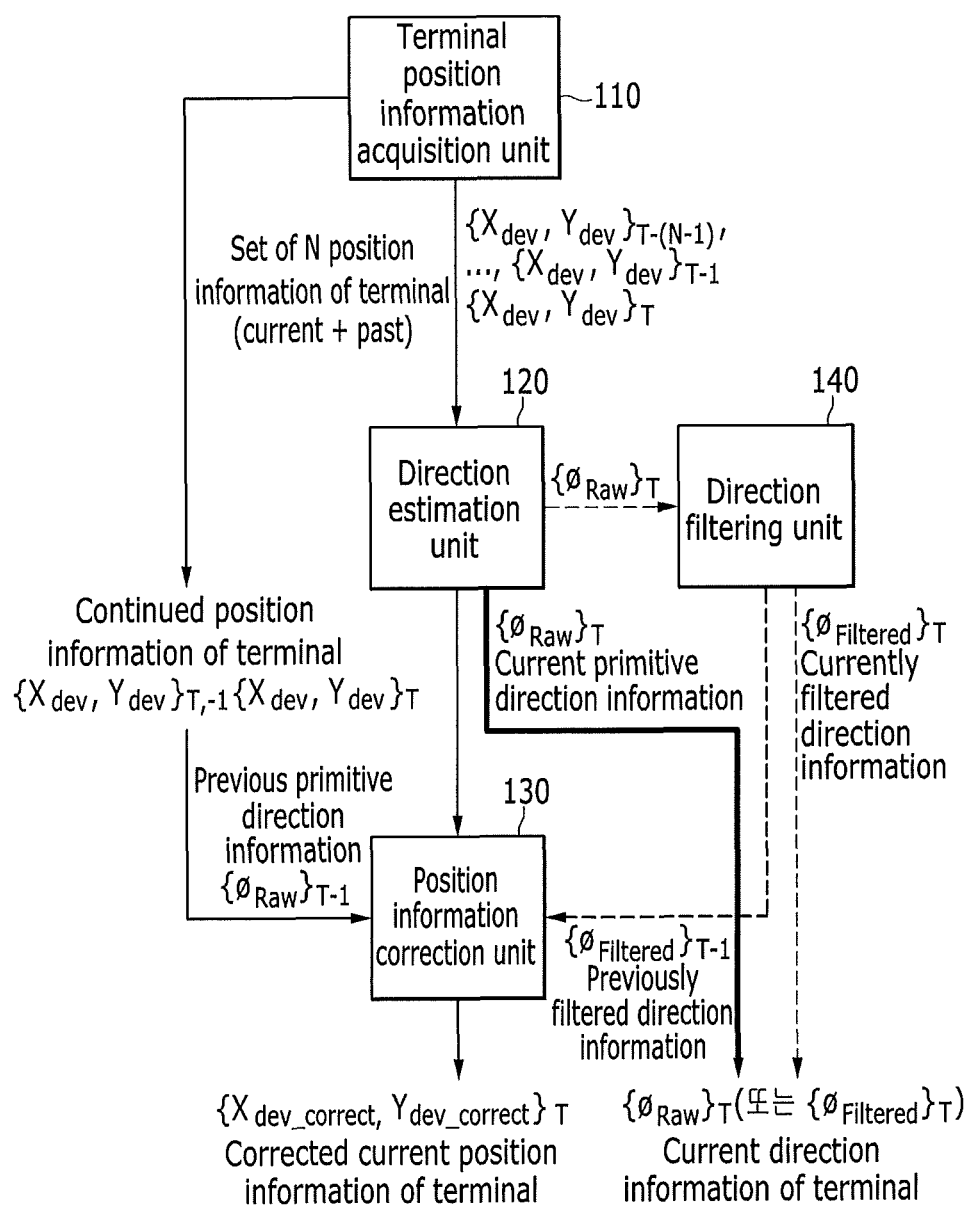
FIG. 2 is a diagram illustrating functions of each component configuring a positioning apparatus according to the exemplary embodiment of the present invention.

FIG. 2 is a diagram illustrating functions of each component configuring the positioning apparatus according to the exemplary embodiment of the present invention.

The terminal position information acquisition unit 110 receives the position information of the wireless local area network (WLAN)-based terminal.

The direction estimation unit 120 estimates a moving path direction (heading) of a terminal based on the position information. In particular, the moving path direction of the terminal is estimated based on N pieces of position information including current position information and past position information of the terminal. As illustrated in FIG. 2, the N pieces of position information may be represented by $\{X_{dev}, Y_{dev}\}_{T-N-1}, \ldots, \{X_{dev}, Y_{dev}\}_{T-1}, \{X_{dev}, Y_{dev}\}_T$. Here, T represents a current time.

Figure 3:
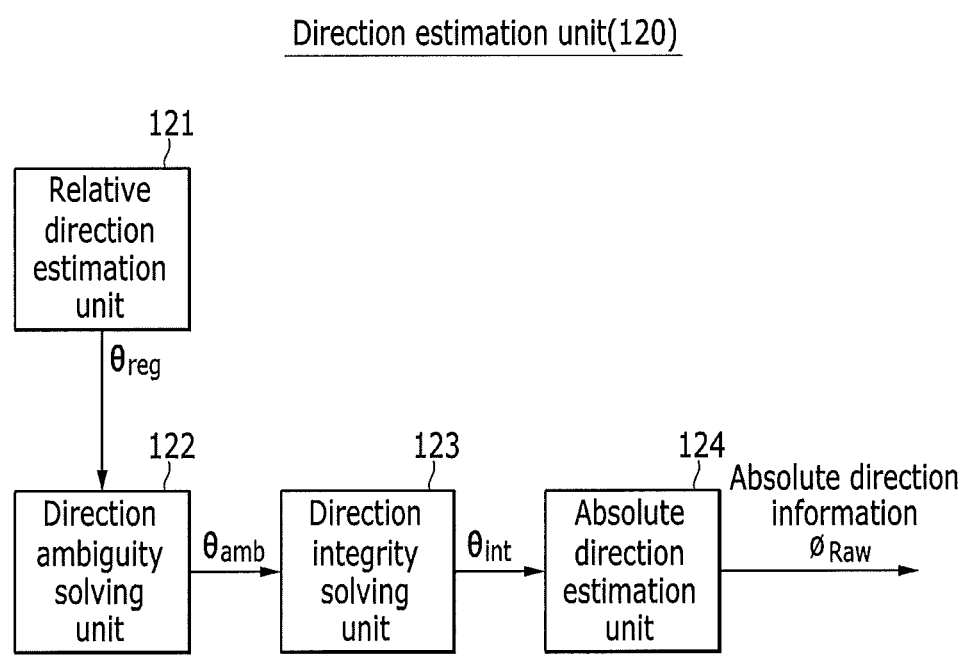
FIG. 3 is a diagram illustrating a structure of a direction estimation unit according to an exemplary embodiment of the present invention.

FIG. 3 is a diagram illustrating a structure of a direction estimation unit according to an exemplary embodiment of the present invention.

As illustrated in FIG. 3, the direction estimation unit 120 includes a relative direction estimation unit 121, a direction ambiguity solving unit 122, a direction integrity solving unit 123, and an absolute direction estimation unit 124.

The relative direction estimation unit 121 performs regression analysis based on a set of position information of a terminal including N pieces of position information to estimate the relative direction information. The estimated relative direction information may be represented by "$\theta_{reg}$".

The direction ambiguity solving unit 122 solves direction ambiguity for the estimated relative direction information. That is, the direction ambiguity solving unit 122 determines whether the estimated relative direction information is a forward direction or a backward direction. The relative direction information without direction ambiguity may be represented by "$\theta_{amb}$", and for convenience of explanation, may be called "first relative direction information".

The direction integrity solving unit 123 removes information with direction distortion for the relative direction information without direction ambiguity. The direction is estimated based on wireless local area network (WLAN)-based position information having a large noise characteristic and thus the distortion may occur. To solve the distortion, the distorted direction information is filtered within a maximum integrity tolerance limit. This will be described below in more detail. The relative direction information without direction ambiguity may be represented by "$\theta_{int}$", and for convenience of explanation, may be called "second relative direction information".

The absolute direction estimation unit 124 estimates the absolute direction information based on the relative direction information without direction integrity. Here, the estimated absolute direction information may be represented by "$\Phi_{Raw}$", and may also be called "primitive direction information".

The absolute direction information output from the direction estimation unit 120 having the above structure is transferred to the terminal position correction unit 130.

The terminal position correction unit 130 corrects the current position information of the terminal based on the input absolute direction information. Herein, the absolute direction information which is used at the time of correcting the position information of the terminal may be the absolute direction information provided from the direction estimation unit 120 or filtered direction information provided from the direction filtering unit 140 to be described later.

As illustrated in FIG. 2, the terminal position correction unit 130 receives continuous position information $\{X_{dev}, Y_{dev}\}_{T-1}, \{X_{dev}, Y_{dev}\}_T$ of the terminal provided from the terminal position information acquisition unit 110 and corrects the received position information based on the primitive direction information "$\Phi_{Raw}$" or the filtered direction information "$\Phi_{Filtered}$" to output the corrected current position information of the terminal $\{X_{dev\_correct}, Y_{dev\_correct}\}_T$.

Meanwhile, the direction filtering unit 140 may be optionally included in the positioning apparatus 100, and performs filtering on the absolute direction information provided from the direction estimation unit 120, that is, the primitive direction information "$\Phi_{Raw}$", to output the filtered absolute direction information. The direction filtering unit 140 performs filtering such as Kalman filtering and Kalman smoothing to output the filtered absolute direction information.

Next, the method for determining a moving direction of a terminal and correcting a position thereof according to the exemplary embodiment of the present invention will be described with reference to a positioning apparatus having the above structure.

Figure 4:
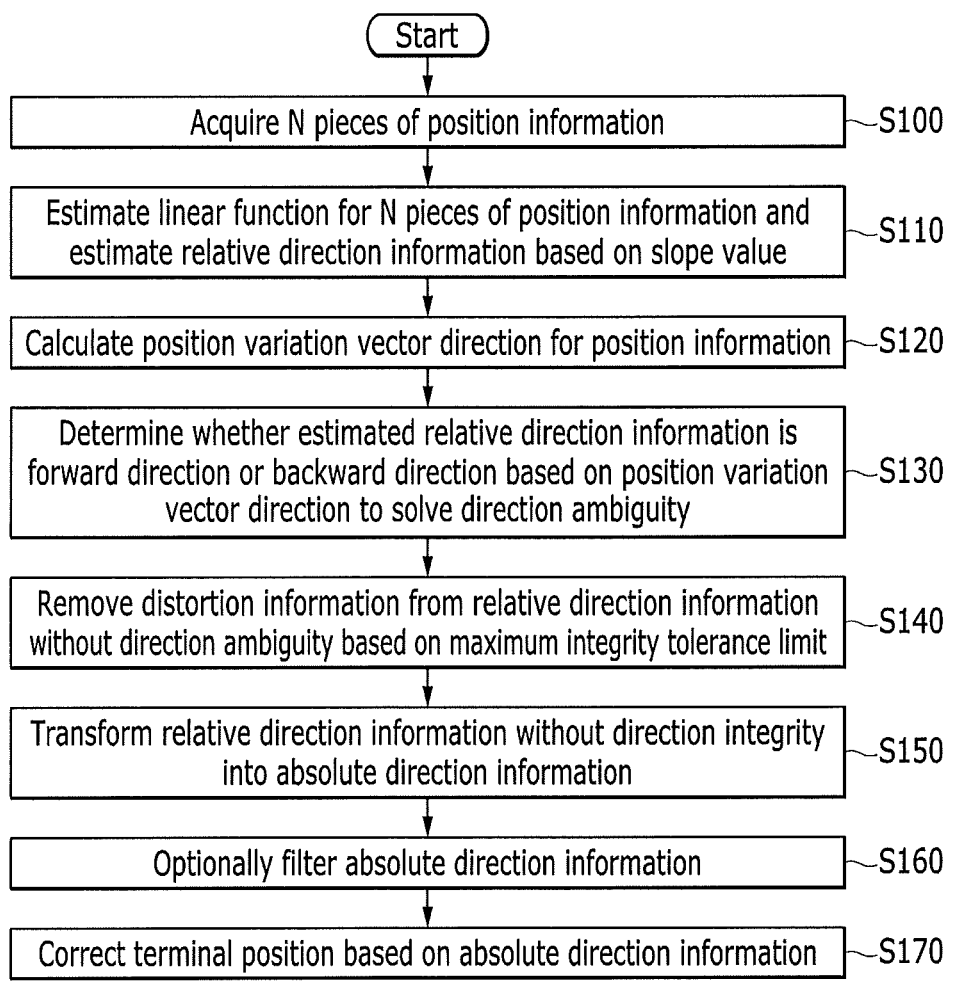
FIG. 4 is a flowchart of a method for determining a moving direction of a terminal and correcting a position thereof according to an exemplary embodiment of the present invention.

FIG. 4 is a flowchart of a method for determining a moving direction of a terminal and correcting a position thereof according to an exemplary embodiment of the present invention.

First, the position information of the terminal is acquired. The terminal position information acquisition unit 110 uses the N pieces of position information including the current position information of the terminal as a set of the position information of the terminal for determining the moving direction of the terminal and correcting the position thereof (S100).

The relative direction information is calculated based on the set of position information of the terminal including the current position information and the plurality of pieces of past position information. The relative direction information represents the moving path direction of the terminal calculated for any coordinate system. The direction estimation unit 120 estimates a linear function passing through the N pieces of position information included in the set of position information of the terminal based on a regression analysis method, and calculates the relative direction information from an estimated slope value of the linear function (S110).

Here, N represents a total number of pieces of position information of the terminal which is used at the time of estimating the relative direction, which may be determined by an experimental method. For the estimation of the linear function, an N value needs to be set to a value which is at least equal to or more than 2. The N value may be affected by a motion speed of a pedestrian, the accuracy and scan period of position information, and the like. The larger the N value, the more the pieces of past position information are used, such that the relative direction information may be more stably estimated even in the case of using the position information having large noise characteristics, but the relative direction information having a large latency may be estimated.

According to the exemplary embodiment of the present invention, the N value of a total number of pieces of position information included in the set of position information of the terminal is appropriately set in consideration of the above matters.

FIG. 5 is an exemplified diagram of position information and a linear function therefor according to the exemplary embodiment of the present invention.

For example, in the case of the Wi-Fi-based position information, the position error of the terminal corresponding to about a 5 m level may be acquired, and the position information of about 1 Hz on the terminal supporting the Wi-Fi function may be acquired. In this case, provided that a user of a terminal moves under the general walking environment (for example, stride: 70 cm, stride cycle: 2 Hz→motion speed=1.4 m/s), the N value may be set between a maximum value Max which may reflect a motion characteristic deviating from a position error range of a terminal and a minimum value Min which has an estimation error of the moving path direction of the terminal due to a tolerable latency.

In the walking environment (motion speed=1.4 m/s), for example, as illustrated in FIG. 5, when a current time is T and the N value is 5, five pieces of position information (for example, position information corresponding to time T, T-1, T-2, T-3, and T-4) may be included in the set of position information of the terminal.

A distance between the current position (position at the current time T) of the terminal and the position (position at time T−(N−1)) of the terminal at the most distant past time is 1.4 m/s×4 s=6.4 (m). The distance is larger than the position error (about 5 m) of the terminal, and thus the moving characteristic of the terminal is reflected such that the moving path direction may be estimated. Further, when the N value is 5, the position information having a latency of at most 4 seconds with respect to the current time is used, and in this case, the estimation error of the moving path direction due to the occurring latency is an allowable level at the time of using the general position-based service in consideration of a motion speed (for example, 1.4 m/s) of a pedestrian moving at a low speed According to the exemplary embodiment of the present invention, when considering the maximum value Max which may reflect the motion characteristic deviating from the position error range of the terminal and the minimum value Min having the estimation error of the moving path direction of the terminal due to the tolerable latency, the N value may be set to be, for example, "5", but the present invention is not limited thereto.

Next, the ambiguity of the relative direction information which is estimated as described above is solved. That is, when the relative direction information is estimated based on the slope value of the linear function for the position information, there is ambiguity that whether the moving direction of the pedestrian is a forward direction $\theta_1$ or a backward direction $\theta_2$ is not clear. To solve this problem, a position variation vector direction $\theta_{pos\_diff}$ for the current and post position information is calculated (S120), and it is finally determined whether the moving direction of the pedestrian is the forward direction $\theta_1$ or a backward direction $\theta_2$ by comparing the calculated position variation vector direction $\theta_{pos\_diff}$ with the relative direction information $\theta_{reg}$ calculated in step S110 (S130).

Figure 6:
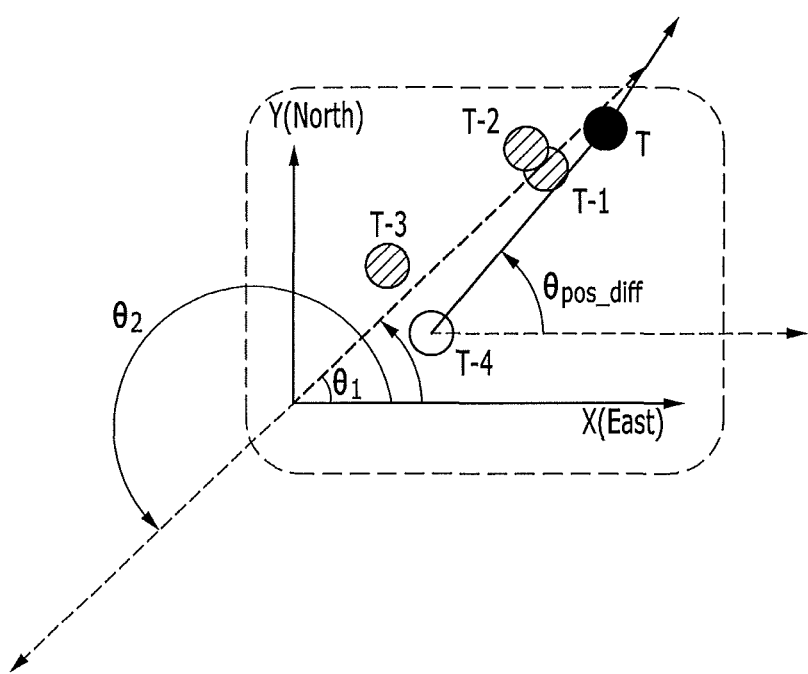
FIG. 6 is an exemplified diagram of a position variation vector for relative direction information according to the exemplary embodiment of the present invention.

FIG. 6 is an exemplified diagram of a position variation vector for relative direction information according to the exemplary embodiment of the present invention.

The position variation vector of the current and past position information may be calculated as follows.

Position variation vector $\theta_{pos\_diff}$=position vector at time $T$−position vector at time($T$−($N$−1)) (Equation 1)

Here, T represents the current time of the terminal.

Depending on the above Equation 1, the position information at the earliest time and the change direction of the position information at the current time are calculated, thereby estimating the moving direction of the terminal over time.

As described above, when the position variation vector $\theta_{pos\_diff}$ is calculated, the moving direction for the relative direction information is determined based on the position variation vector to acquire the relative direction information $\theta_{amb}$ without direction ambiguity. A process of solving the direction ambiguity for the relative direction information $\theta_{amb}$ will be described below.

$\theta_{reg}$:$\theta_1$ or $\theta_2$(=$\theta_1$+180°)

Determine $\theta_{reg}$($\theta_1$ or $\theta_2$)satisfying $|\theta_{reg}-\theta_{pos\_diff}|\leq 90$ as $\theta_{amb}\rightarrow\theta_{amb}=\theta_{reg}$ (Equation 2)

For the relative direction information $\theta_{amb}$, since the current direction ambiguity is present only in the two directions (forward direction or backward direction), it is enough to solve only the direction ambiguity within a range of ±90° with respect to a true direction. Therefore, the value $\theta_1$ or $\theta_2$ of which a difference absolute value $|\theta_{reg}-\theta_{pos\_diff}|$ of the relative direction information ($\theta_{reg}$: $\theta_1$ or $\theta_2$) calculated in step S110 and the position variation vector direction $\theta_{pos\_diff}$ of the current and past position information is present in a predetermined angle (for example, 90°) is finally determined as the relative direction information $\theta_{amb}$.

Figure 7:
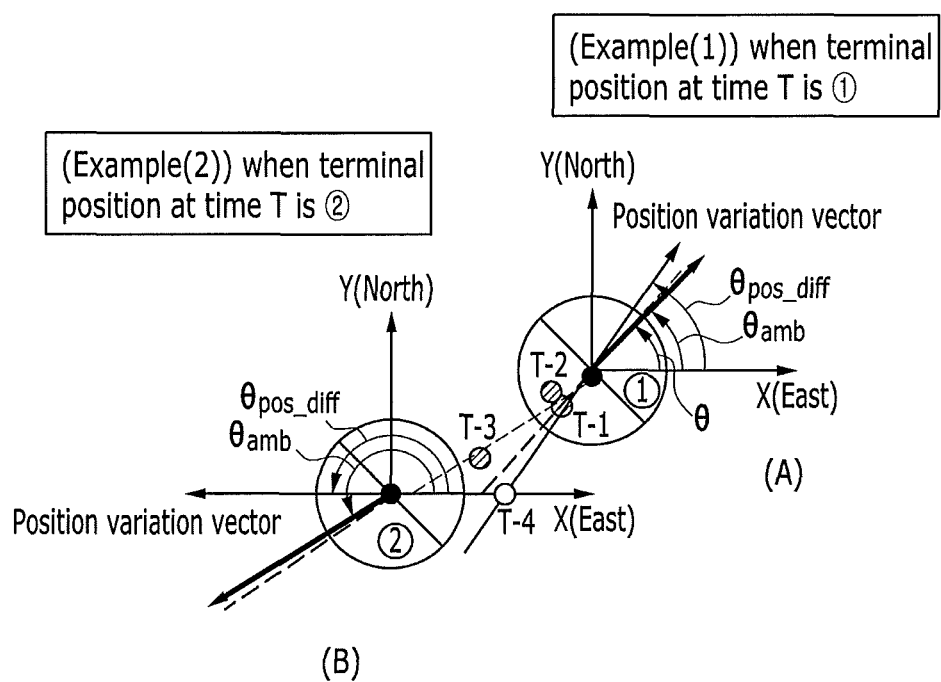
FIG. 7 is an exemplified diagram illustrating a process of determining relative direction information without direction ambiguity according to an exemplary embodiment of the present invention.

FIG. 7 is an exemplified diagram illustrating a process of determining relative direction information without direction ambiguity according to an exemplary embodiment of the present invention.

FIG. 7 illustrates a case (A) in which the position of the terminal is ① at the current time T and a case (B) in which the position of the terminal is ② at the current time T.

The positions of the terminal at time T1, T-2, T-3, and T-4 are the same, and the moving path directions of the terminal may be set to be contrary to each other according to the positions of the terminal at current time T.

When the position of the terminal is ① at the current time T, the relative direction information $\theta_{amb}$ without direction ambiguity is determined as the forward direction as illustrated in FIG. 7 (A) based on the position variation vector direction $\theta_{pos\_diff}$ and the relative direction information.

Meanwhile, when the position of the terminal is ② at the current time T, the relative direction information $\theta_{amb}$ in without direction ambiguity is determined as the backward direction as illustrated in FIG. 7B based on the position variation vector direction $\theta_{pos\_diff}$ and the relative direction information $\theta_{amb}$.

As described above, the relative direction information in which the direction ambiguity is solved is acquired by finally determining whether the relative direction information of the terminal is the forward direction or the backward direction, and then the direction integrity for the relative direction information without direction ambiguity may be subjected to the following processing process.

The wireless local area network (WLAN)-based position information has large noise characteristics and therefore the relative direction information acquired based on the position information may be distorted. When the relative direction information θamb without direction ambiguity is distorted due to the wireless local area network (WLAN)-based position information temporarily having the large noise characteristics, to solve the distortion, according to the exemplary embodiment of the present invention, the relative direction information distorted within the maximum integrity tolerance limit is filtered to prevent the direction from being suddenly changed. When the relative direction information without direction ambiguity exceeds the maximum integrity tolerance limit, the current direction information is initialized based on the corresponding information by determining that the direction of the relative direction information is not temporarily distorted but is substantially changed (S140).

FIG. 8 is an exemplified diagram illustrating a process of acquiring relative direction information $\theta_{int}$ without direction integrity for two different pedestrian motion scenarios according to an exemplary embodiment of the present invention.

First, the pedestrian motion scenario is a case in which a pedestrian moves forward in one direction. In this case, the actual moving path direction information needs to be constantly determined, but some of the relative direction information $\theta_{amb}$ without direction ambiguity substantially acquired provides the distorted direction information. That is, since the direction is estimated based on the WLAN-based position information having the large noise characteristics, the corresponding situation may occur when the direction ambiguity is not completely solved. In this case, the direction integrity solving unit 122 filters the information in which the direction distortion occurs within the maximum integrity tolerance limit. The exemplary embodiment of the present invention performs the filtering, for example, in the case in which the maximum integrity tolerance limit is "3", but is not limited thereto.

The corresponding information is filtered by determining that the direction distortion occurs when the relative direction information without direction ambiguity is positioned within the maximum integrity tolerance limit. Further, when the relative direction information without direction ambiguity exceeds the maximum integrity tolerance limit, the corresponding information is used as the current direction information by determining that the direction of the relative direction information is substantially changed. The abnormal relative direction information may be removed by the filtering.

Second, the pedestrian motion scenario is a case in which a pedestrian moves forward in one direction and then moves backward.

In this case, there is a need to estimate the actual direction information as a constant backward direction after a constant forward direction. However, similar to the first scenario, the direction information in which the direction ambiguity is not completely solved may be estimated. To overcome the above problem, when the maximum integrity tolerance limit is set to be, for example, 3 and the filtering is performed, the abnormal direction information is removed, but the latency may occur of as much as duration (for example, when the position is acquired at 1 Hz, the duration corresponds to 3 seconds) within the maximum integrity tolerance limit. Therefore, the maximum integrity tolerance limit may be set within the tolerable latency range in the corresponding positioning technology or the position-based service. In this way, the more accurate direction information may be provided.

In FIG. 8, an arrow represents the relative direction information, an arrow represented by a solid line represents a direction in which the integrity problem does not occur, an arrow represented by a bold solid line represents a direction prior to solving the integrity problem when the integrity problem occurs, and an arrow represented by a dotted line represents a direction after solving the integrity problem when the integrity problem occurs.

According to the first pedestrian motion scenario, when the relative direction information before the direction integrity is solved is given as illustrated in FIG. 8 (A), in the case in which the relative direction information represents the forward direction twice and then represents the backward direction, the information representing the backward direction is positioned within the maximum integrity tolerance limit and thus it is determined that the direction distortion occurs, such that the corresponding backward direction information is filtered and removed and is processed as the forward direction. As described above, when the relative direction information represents the same direction and then represents another direction by the number of times that the relative direction information is positioned within the maximum integrity tolerance limit, the corresponding information representing another direction is determined to be the distorted information and thus is removed. After the filtering processing, the distortion for the relative direction information is removed before the integrity including the forward direction and the backward direction is solved, and thus all the relative direction information without integrity determined as the forward direction is acquired.

Further, according to the second pedestrian motion scenario, even when the relative direction information before the direction integrity is solved is given as illustrated in FIG. 8 (B), the direction information positioned within the maximum integrity tolerance limit as described above is removed. When the relative direction information before the integrity is solved represents the backward direction four times, the corresponding direction is determined to be the backward direction by determining that the direction of the relative direction information is substantially changed. As described above, when the relative direction information represents the same direction and then represents another direction by the number of times that the relative direction information deviates from the maximum integrity tolerance limit, the corresponding information representing another direction is determined to be the information without distortion and thus is used as the direction information. After the filtering processing, the relative direction information without integrity due to the removal of the distortion of the relative direction information is acquired.

By the above process, when the relative direction information $\theta_{int}$ without direction integrity is acquired, the absolute direction estimation unit 124 transforms the relative direction information $\theta_{int}$ into the absolute direction information (S150).

The relative direction information represents the moving path direction of the terminal calculated for any coordinate system, and for example, in the case of a two-dimensional indoor map, a reference coordinate system (X-Y axes) within the indoor map may be set and the relative direction information θ of the moving path of the terminal in a counterclockwise direction with respect to the X axis may be calculated. However, for the reference coordinate system to display the moving path of the terminal on another indoor map or a global map, there is a need to change the relative direction information into the absolute direction information Φ such as the relative azimuth information defined in a counterclockwise direction based on true north. Therefore, a rotational transform operation is performed by using attribute information (example: a direction difference value between the Y axis and the true north of the indoor map coordinate system) within an indoor map or other ancillary information to transform the relative direction information into the absolute direction information (example: azimuth). The absolute direction information is finally determined as the moving path direction of the terminal.

Meanwhile, the filtering is performed on the absolute direction information acquired by the above process, and the filtered absolute direction information may be acquired (S160). The process may be optionally performed.

Figure 9:
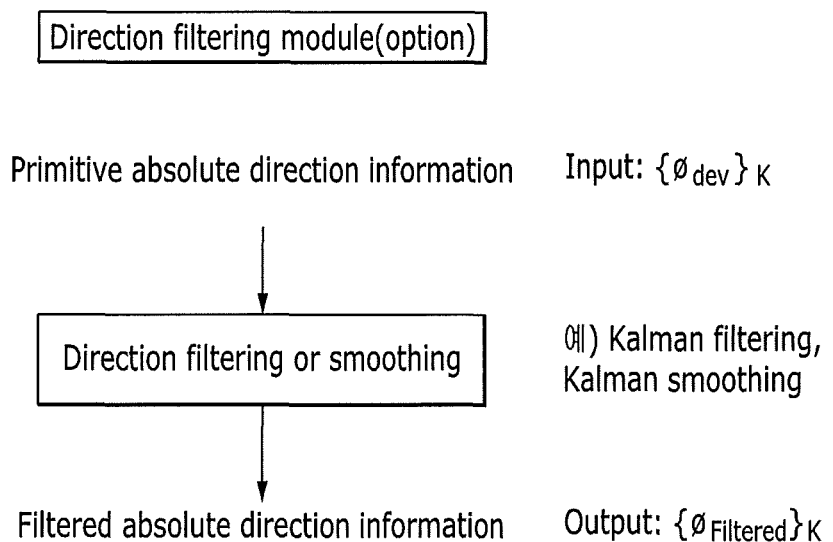
FIG. 9 is a diagram illustrating a process of filtering absolute direction information according to an exemplary embodiment of the present invention.

FIG. 9 is a diagram illustrating a process of filtering absolute direction information according to an exemplary embodiment of the present invention. The direction filtering unit 140 performs processing such as Kalman filtering and Kalman smoothing on the absolute direction information transferred from the absolute direction estimation unit 124 of the direction estimation unit 120, that is, the primitive direction information $\Phi_{Raw}$, to output the filtered absolute direction information $\Phi_{Filtered}$. The filtered absolute direction information $\Phi_{Filtered}$ may be finally used as the moving path direction of the terminal.

As described above, the moving path direction of the terminal is finally determined and then the position of the terminal is corrected based on the moving path direction (S170).

Figure 10:
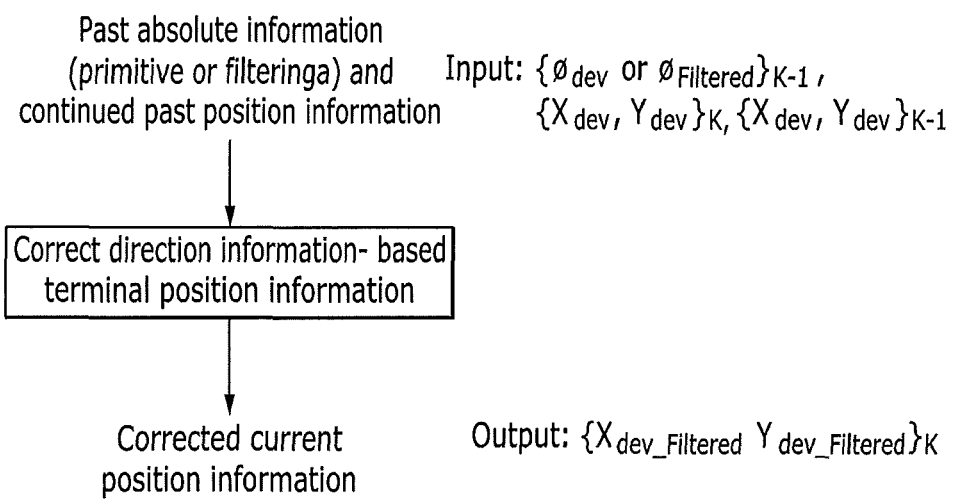
FIG. 10 is a diagram illustrating a process of correcting a position of a terminal according to an exemplary embodiment of the present invention.

FIG. 10 is a diagram illustrating a process of correcting a position of a terminal according to an exemplary embodiment of the present invention.

The terminal position correction unit 130 corrects the current position information using the absolute direction information (primitive absolute direction information or filtered absolute direction information) acquired in the past and the continued past position information. The process of correcting a position according to the exemplary embodiment of the present invention is represented by algorithm as follows.

(Equation 3)

(Logic) if ($\vec{\Delta p} \cdot \vec{\phi} < 0$) —— CONDITIONAL SENTENCE 1
$\vec{P}_{filtered\_K} = \vec{P}_{filtered\_K-1}$
else
if ($\vec{\Delta p}_{heading\_K} \cdot \vec{\phi} \geq 0$) —— CONDITIONAL SENTENCE 2
$\vec{P}_{filtered\_K} = \vec{P}_{filtered\_K}$
else
$\vec{P}_{filtered\_K} = \vec{P}_{filtered\_K-1}$
end
end The direction vector $\vec{\phi}$ for the absolute direction information {φRaw}T or {φfiltered}T) acquired at the current time T is acquired and the position variation vector $\vec{\Delta p}_{heading\_K}$ to the previous filtering position, that is, a vector between the previous filtering position and the positions of the terminal of which the directions are matched at the current time is acquired based on the absolute direction information $\{\phi_{Raw}\}$T-1 or $\{\phi_{filtered}\}$T-1 acquired in the past. Further, the position variation vector for the continued position information $(X_{dev}, Y_{dev})_k$, $\{X_{dev}, Y_{dev}\}_{k-1}$, that is, the position variation vector $\vec{\Delta P}$ to the previous measurement position, is acquired.

The conditional sentences for correcting the position information of the terminal based on the direction information are as follows.

In the conditional sentence 1, the position is corrected based on an inner product value of the position variation vector $\vec{\Delta P}$ to the previous measurement position and the direction vector $\vec{\phi}$.

In detail, when the inner product value $\vec{\Delta P} \ \vec{\phi}$ of the position variation vector $\vec{\Delta P}$ to the previous measurement position and the direction vector $\vec{\phi}$ is a positive number or has a value of "0", it is determined that the correlation between the measurement position change direction and the calculated direction is present and thus the measured position and direction are finally determined to be reliable information. In this case, the finally filtered position of the terminal is calculated depending on the condition of the conditional sentence 2. Here, the filtered position of the terminal represents the corrected position of the terminal.

On the other hand, when the inner product value $\vec{\Delta P} \ \vec{\phi}$ of the position variation vector $\vec{\Delta P}$ to the previous measurement position and the direction vector $\vec{\phi}$ is a negative number, it is determined that the correlation between the measurement position change direction and the calculated direction is not present and thus the measured position and direction are finally determined to not be reliable information. In this case, as the finally filtered position of the terminal, the filtered position of the previous time is used. That is, as the final current position information of the terminal, the position information of the terminal which is acquired at the previous time (for example, T-1) and is corrected based on the moving path direction is used.

Meanwhile, in the conditional sentence 2, the position is corrected based on an inner product value of the position variation vector $\vec{\Delta p}_{heading\_K}$ to the previous filtering position and the direction vector $\vec{\phi}$.

In the condition sentence 1, when the inner product value $\vec{\Delta P} \ \vec{\phi}$ of the position variation vector $\vec{\Delta P}$ to the previous measurement position and the direction vector $\vec{\phi}$ is a positive number or has a value of "0", and the inner product value $\vec{\Delta p}_{heading\_K} \bullet \vec{\phi}$ of the position variation vector $\vec{\Delta p}_{heading\_K}$ to the previous filtering position and the direction vector $\vec{\phi}$ is a positive number or has a value of "0", it is determined that the correlation between the filtering position change direction and the calculated direction is present and thus the filtering position and direction are finally determined to be reliable information. In this case, to reduce the instability of the position of the terminal, as the finally filtered position of the terminal, the direction matched position is used. Herein, the direction matched position represents a position at which the current terminal direction vector $\vec{\phi}$ matches the current position information $\vec{P}_k$ of the terminal.

Meanwhile, in the condition sentence 1, when the inner product value $\vec{\Delta P} \cdot \vec{\phi}$ of the position variation vector $\vec{\Delta P}$ to the previous measurement position and the direction vector $\vec{\phi}$ is a positive number or has a value of "0", and the inner product value $\vec{\Delta p}_{heading\_K} \cdot \vec{\phi}$ $\vec{\Delta p}_{heading\_K}$ of the position variation vector $\vec{\Delta p}_{heading\_K}$ $\vec{\phi}$ to the previous filtering position and the direction vector $\vec{\phi}$ $\vec{\Delta p}_{heading\_K} \cdot \vec{\phi}$ is a negative number, it is determined that the correlation between the filtering position change direction and the calculated direction is not present and thus the filtering position and direction are finally determined to not be reliable information. In this case, as the finally filtered position of the terminal, the filtered position of the previous time is used.

The method for correcting a position based on the conditional sentences as described above will now be described in more detail.

Figure 11:
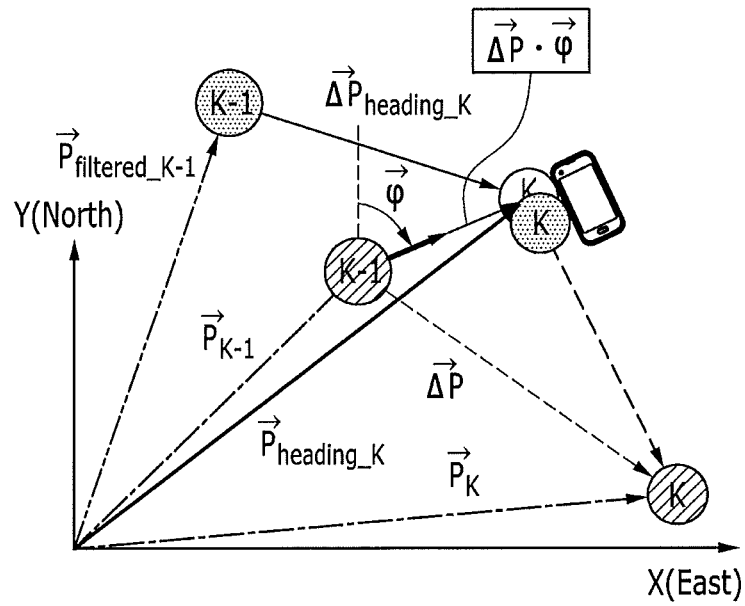
FIGS. 11 and 12 are diagrams illustrating a principle of correcting position information of a terminal according to conditional sentences for correcting position information of a terminal based on direction information according to an exemplary embodiment of the present invention.
Figure 12:
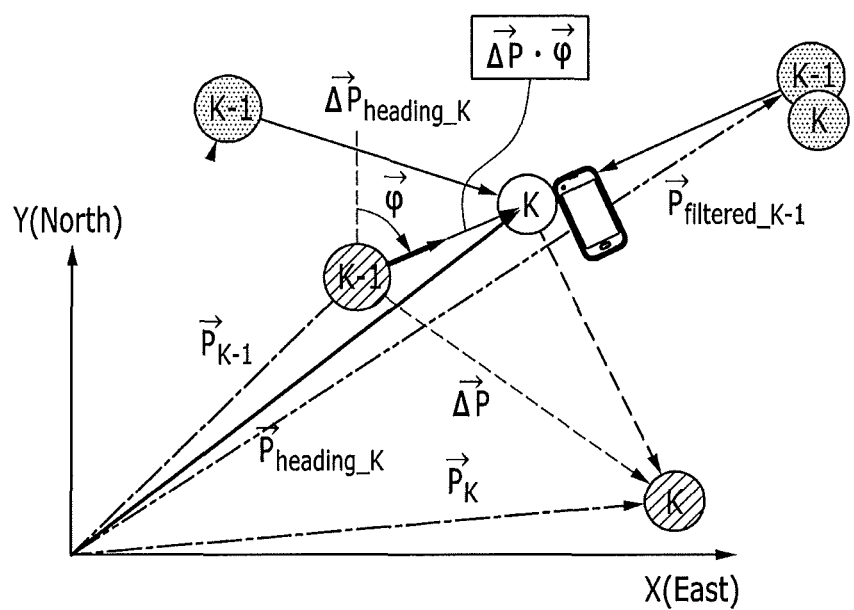

FIGS. 11 and 12 are diagrams illustrating a principle of correcting position information of a terminal according to conditional sentences for correcting position information of a terminal based on direction information according to an exemplary embodiment of the present invention.

Two cases of correcting the position information of the terminal based on the conditional sentences are present.

A first correction example is a case in which the correlation $\vec{\Delta P} \cdot \vec{\phi}$ between the measure position variation and the calculated direction information is present $\vec{\Delta P} \cdot \vec{\phi}$ and the correlation $\vec{\Delta p}_{heading\_K} \cdot \vec{\phi}$ between the filtering position change direction and the calculated direction information is present $\vec{\Delta p}_{heading\_K} \cdot \vec{\phi}$. That is, the first correction example is the case in which the corresponding inner product values according to the conditional sentence 1 and the conditional sentence 2 are a positive number or a value "0". The first correction example is illustrated in FIG. 11. Like the correction example of FIG. 11, the moving path direction of the terminal acquired in step S150 matches the position of the terminal measured at time K, and thus the direction matched position acquired at time K is used as the finally filtered position of the terminal.

A second correction example is a case in which the correlation $\vec{\Delta P} \cdot \vec{\phi}$ between the measurement position variation and the calculated direction information is not present $\vec{\Delta P} \cdot \vec{\phi}$ or even though the correlation between the measurement position variation and the calculated direction information is present, the correlation $\vec{\Delta p}_{heading\_K} \cdot \vec{\phi}$ between the filtering position change direction and the calculated direction information is not present $\vec{\Delta p}_{heading\_K} \cdot \vec{\phi}$. That is, the second correction example is the case in which the inner product value according to the conditional sentence 1 is a positive number or has a value of "0" or is a negative number and the inner product value according to the conditional sentence 2 is a negative number. The second correction example is illustrated in FIG. 12. In this case, as the finally filtered position of the terminal, the filtered position of the previous time is used. That is, like the correction example of FIG. 12, the filtered position of the terminal acquired at the previous time K-1 is used as the finally filtered position of the terminal.

As described above, according to the exemplary embodiment of the present invention, by using the determined direction information of the terminal, when the primitive position information (herein, the primitive position information represents the position information which is not corrected) is present in the determined direction, the corresponding primitive position information matches the determined direction, and when the primitive position information largely deviates from the determined direction, the correction is performed in the direction in which the primitive position information is removed to provide the reliable position information of the terminal.

Figure 13:
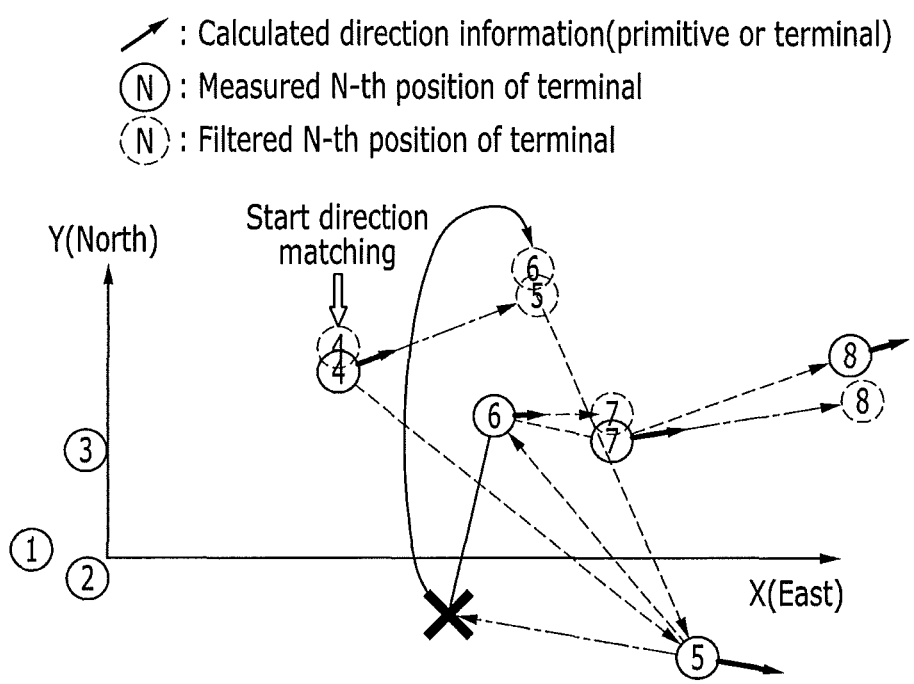
FIG. 13 is a diagram illustrating a process of correcting position information of a terminal based on the direction information for any continuous terminal positions based on the process of correcting a position of a terminal as described above.

FIG. 13 is a diagram illustrating a process of correcting position information of a terminal based on the direction information for any continuous terminal positions based on the process of correcting a position of a terminal as described above.

A circle represented by a solid line represents the primitively measured position of the terminal, and a circle represented by a dotted line represents the filtered position of the terminal. Further, when a number within a circle is N, the N represents an N-th position of the terminal and a bold arrow represents the calculated primitive or filtered direction information. It is assumed that in FIG. 13, the direction is determined from a fourth position of the terminal. The filtered fourth position of the terminal is determined as the current position of the terminal since there is no previous filtered position. Next, the positions of the terminal which are continuously filtered from fifth to eighth are determined based on the conditional sentences 1 and 2. In detail, since the conditional sentence 1 is a positive number and the conditional sentence 2 is a positive number, the filtered fifth position of the terminal is determined as the direction matched position. Since the conditional sentence 1 is a negative number, the filtered sixth position is determined as the previous filtered position. Further, since the conditional sentence 1 is a positive number and the conditional sentence 2 is a positive number, the filtered seventh and eighth positions of the terminal are determined as the direction matched positions.

When the position information of the terminal is corrected based on the direction information, the performance improvement may be provided as follows.

Figure 14:
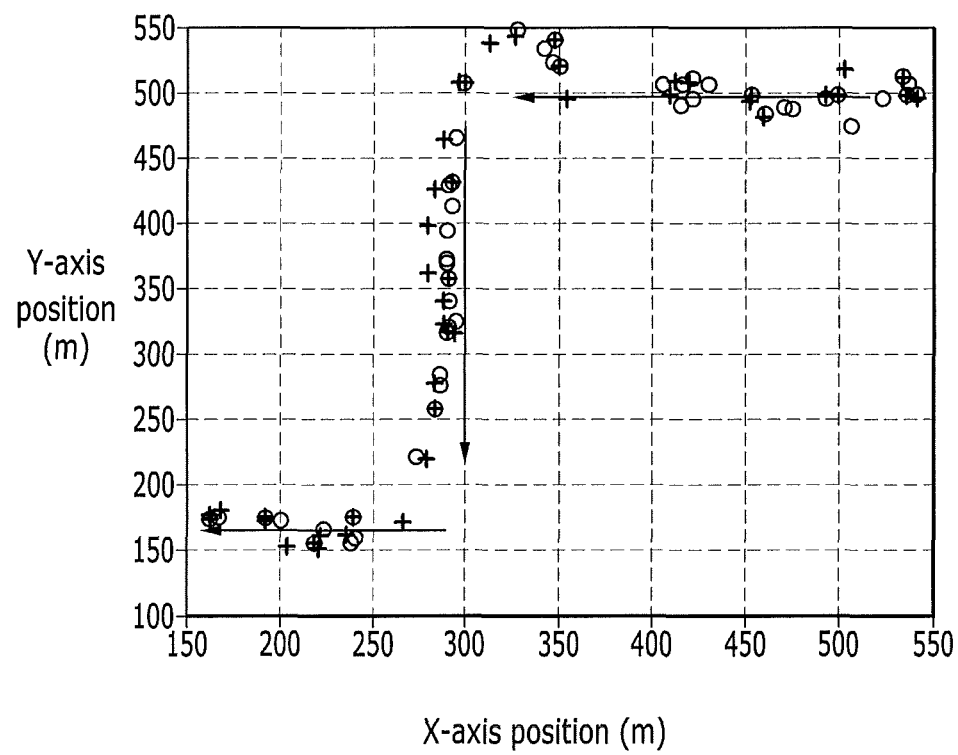
FIGS. 14 and 15 are graphs illustrating positioning performance according to a method for determining a moving direction and correcting a position according to an exemplary embodiment of the present invention.
Figure 15:
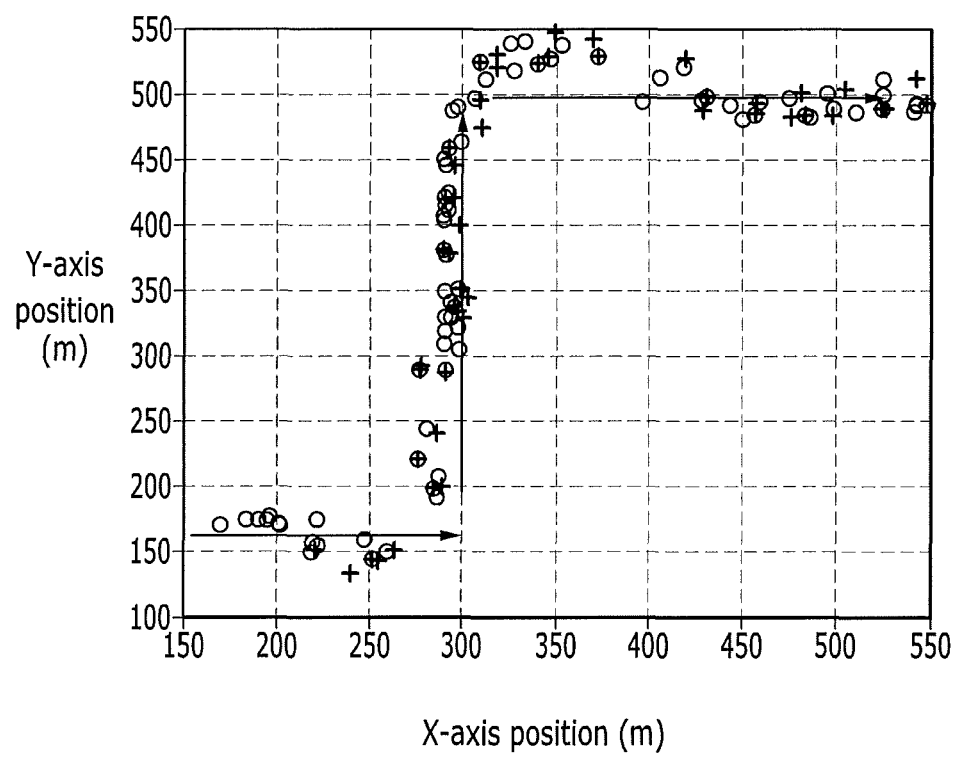

FIGS. 14 and 15 are graphs illustrating positioning performance according to a method for determining a moving direction and correcting a position according to an exemplary embodiment of the present invention.

FIGS. 14 and 15 illustrate the case in which the method according to the exemplary embodiment of the present invention is applied to a scenario in which a pedestrian moves along a predetermined test path and then returns again. In particular, FIG. 14 illustrates the case in which a pedestrian moves in a forward direction and FIG. 15 illustrates the case in which a pedestrian returns in a backward direction which is opposite to the forward direction of FIG. 14. In FIGS. 14 and 15, "○" represents a position value before the position correction is performed based on the direction information and "+" represents a position value after the position correction is performed.

Referring to FIGS. 14 and 15, from the result of performing the position correction of the direction-based terminal according to the exemplary embodiment of the present invention, it may be appreciated that the positioning error repeatedly jumping back and forth with respect to the true position is dramatically reduced. Further, a sense of fatigue of the user of the terminal which is perceived due to the position error (for example, swaying back and forth, and the like) may be minimized by generally estimating the position of the terminal based only on the actual moving direction.

Meanwhile, according to the exemplary embodiment of the present invention, when the absolute direction information obtained by filtering or performing smoothing filtering to the primitive absolute direction information is used, noise characteristics are reduced.

Figure 16:
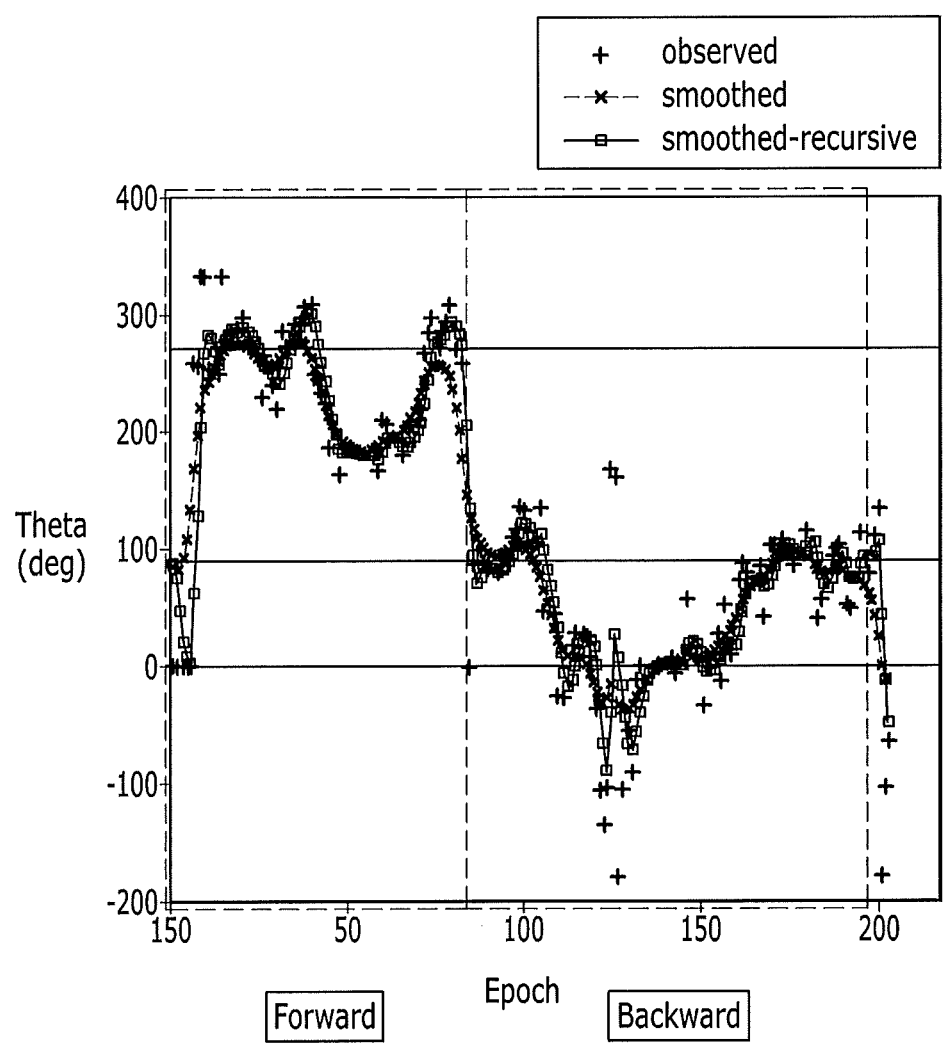
FIG. 16 is a graph illustrating absolute direction information characteristics having reduced noise according to an exemplary embodiment of the present invention.

FIG. 16 is a graph illustrating absolute direction information characteristics having reduced noise according to an exemplary embodiment of the present invention.

FIG. 16 illustrates the direction filtering performance for a test path in which a pedestrian moves along the defined path and then returns again. In FIG. 16, "+" represents the primitive absolute direction information, "✱" (applying Kalman smoothing), or "⊕" (applying Kalman recursive smoothing) represents the filtered absolute direction information through the direction filtering unit. The direction information which is more abnormal and has large noise characteristics is removed by the filtering process, thereby providing more continuous direction information to the user of the terminal.

According to the exemplary embodiment of the present invention, the terminal without a sensor providing the direction information, such as a geomagnetism system and a gyroscope, may calculate the moving path direction (heading). Further, since only the current and past position information of the terminal are used, the present invention may be used for the service of determining the moving direction of the terminal regardless of a kind of wireless communication infrastructure (GNSS, cellular, Wi-Fi, Bluetooth, ZigBee, RFID, UWB, and the like) and the positioning method (weighted centroid, trilateration, fingerprinting, and the like). Further, the wireless local area network (WLAN)-based primitive position information having large dispersion is corrected using the determined direction information of the terminal, thereby more continuously and stably providing the position information to the user of the terminal.

In addition, according to the exemplary embodiments of the present invention, it is possible to determine the moving path direction of the terminal using the current and past position information of the terminal which is calculated using the wireless local area network (WLAN). Further, it is possible to accurately correct the position of the terminal using the determined moving path direction information of the terminal.

Further, it is possible for the terminal without the separate direction sensor to determine the direction information using the wireless LAN to simplify the hardware specifications of the terminal, thereby reducing the size of the terminal and saving manufacturing and purchase costs.

Further, it is possible to additionally provide various position-based services using the direction information to the user of the terminal by providing the direction information of the moving path in addition to the position information of the wireless LAN-based terminal. Further, it is possible to overcome the inconvenience of user position recognition due to the display of the position information which is instable and has a large position error and more precisely and smoothly represent the position on the moving path without supporting the map matching of the path information of the map, by correcting the position information of the terminal using the direction information.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for determining a moving path direction of a terminal and correcting a position thereof, comprising:
   acquiring N pieces of position information of the terminal that include current position information and past position information of the terminal;
   calculating a linear function for the N pieces of position information, and estimating relative direction information based on a slope value of the linear function;
   determining whether the estimated relative direction information corresponds to a forward direction or a backward direction, to thereby acquire first relative direction information that is the relative direction information without direction ambiguity;
   removing distortion information from the first relative direction information, to thereby acquire second relative direction information that is the first relative direction information without direction integrity;
   transforming the second relative direction information into absolute direction information, to thereby acquire a moving path direction of the terminal; and
   correcting the current position information of the terminal based on the moving path direction of the terminal.

2. The method of claim 1, wherein:
   the N represents a total number of pieces of position information used at the time of estimating the relative direction information, and is set based on a maximum value reflecting motion characteristics deviating from a position error range of the terminal and a minimum value having a moving path direction estimation error of the terminal due to a tolerable latency.

3. The method of claim 1, wherein the acquiring of the first relative direction information includes:
   calculating a position variation vector direction for the N pieces of position information;
   acquiring a comparison value based on the estimated relative direction information and the position variation vector direction; and
   when the comparison value is present within a predetermined angle by comparing the comparison value with the predetermined angle, using the estimated relative direction information as the first relative direction information.

4. The method of claim 3, wherein:
   the comparison value is an absolute value which is a difference value between the relative direction information and the position variation vector direction.

5. The method of claim 3, wherein the acquiring of the second relative direction information includes:
   when the first relative direction information represents the same direction and then represents another direction by the number of times that the first relative direction information is within a predetermined maximum integrity tolerance limit, determining and removing the first relative direction information representing the another direction as distorted information; and
   when the first relative direction information represents the same direction and then represents another direction by the number of times that the first relative direction information deviates from a predetermined maximum integrity tolerance limit, determining the first relative direction information representing the other direction as information without distortion and using the first relative direction information as the direction information.

6. The method of claim 1, further comprising, after the acquiring of the moving path direction of the terminal, when the absolute direction information acquired by transforming the second relative direction information is primitive absolute direction information, filtering the primitive absolute direction information to acquire filtered absolute direction information.

7. The method of claim 6, wherein, in the acquiring of the filtered absolute direction information, Kalman filtering or Kalman smoothing is performed on the primitive absolute direction information to acquire the filtered absolute direction information.

8. The method of claim 1, wherein the correcting of the position information of the terminal includes:
when the currently acquired position information of the terminal is defined as the primitive position information, in the case in which the primitive position information is present in the moving path direction of the terminal, the moving path direction of the terminal matches the primitive position information to acquire corrected position information; and
in the case in which the primitive position information is not present in the moving path direction of the terminal, removing the primitive position information and using the previously acquired position information of the terminal as the current position information of the terminal.

9. The method of claim 8, further comprising:
acquiring a position variation vector to a previous filtering position, a position variation vector to a previous measurement position, and a direction vector by using the previously acquired absolute direction information and continued past position information;
when an inner product value of the position variation vector to the previous measurement position and the direction vector is a positive number or has a value of "0" or an inner product value of the position variation vector to the previous filtering position and the direction vector is a positive number or has a value of "0", determining that the primitive position information is present in the moving path direction of the terminal; and
when the inner product value of the position variation vector to the previous filtering position and the direction vector has a negative value, determining that the primitive position information is not present in the moving path direction of the terminal.

10. A positioning apparatus of a terminal, comprising:
a terminal position information acquisition unit acquiring N pieces of position information of the terminal that include current position information and past position information of the terminal;
a direction estimation unit, including
a relative direction estimation unit calculating a linear function for the N pieces of position information, and estimating relative direction information based on a slope value of the linear function,
a direction ambiguity solving unit determining whether the estimated relative direction information corresponds to a forward direction or a backward direction, to thereby acquire first relative direction information that is the relative direction information without direction ambiguity,
a direction integrity solving unit removing distortion information from the first relative direction information, to thereby acquire second relative direction information that is the first relative direction information without direction integrity, and
an absolute direction estimation unit transforming the second relative direction information into absolute direction information, to thereby acquire a moving path direction of the terminal; and
a position information correction unit correcting the current position information of the terminal based on the moving path direction of the terminal.

11. The positioning apparatus of claim 10, wherein the direction ambiguity solving unit uses the estimated relative direction information as the first relative direction information when a comparison value based on a position variation vector direction for the N pieces of position information and the estimated relative direction information is present within a predetermined angle, the comparison value being an absolute value of a difference value between the estimated relative direction information and the position variation vector direction.

12. The positioning apparatus of claim 10, wherein the direction integrity solving unit:
when the first relative direction information represents a same direction and then represents another direction by the number of times that the first relative direction information is within a predetermined maximum integrity tolerance limit, determines and removes the first relative direction information representing the another direction as the distorted information; and
determines the first relative direction information representing the another direction as information without distortion and uses the first relative direction information as the direction information when the first relative direction information represents the same direction and then represents another direction by the number of times that the first relative direction information deviates from a predetermined maximum integrity tolerance limit.

13. The positioning apparatus of claim 10, further comprising, when the absolute direction information acquired by transforming the second relative direction information is primitive absolute direction information, a direction filtering unit filtering the primitive absolute direction information to acquire filtered absolute direction information.

14. The positioning apparatus of claim 10, wherein the position information correction unit:
matches the moving path direction of the terminal with primitive position information to acquire corrected position information when the currently acquired position information of the terminal is defined as the primitive position information, in the case in which the primitive position information is present in the moving path direction of the terminal; and
removes the primitive position information and uses the previously acquired position information of the terminal as the current position information of the terminal in the case in which the primitive position information is not present in the moving path direction of the terminal.

15. The positioning apparatus of claim 14, wherein the position information correction unit:

acquires a position variation vector to a previous filtering position, a position variation vector to a previous measurement position, and a direction vector by using the previously acquired absolute direction information and continued past position information;

determines that the primitive position information is present in the moving path direction of the terminal when an inner product value of the position variation vector to the previous measurement position and the direction vector is a positive number or has a value of "0", or an inner product value of the position variation vector to the previous filtering position and the direction vector is a positive number or has a value of "0"; and determines that the primitive position information is not present in the moving path direction of the terminal when the inner product value of the position variation vector to the previous filtering position and the direction vector has a negative value.

* * * * *